UNITED STATES PATENT OFFICE.

ANDERSON FOWLER, OF NEW YORK, N. Y.

METHOD OF CURING AND PRESERVING MEATS.

SPECIFICATION forming part of Letters Patent No. 267,684, dated November 21, 1882.

Application filed October 30, 1880. (No specimens.)

*To all whom it may concern:*

Be it known that I, ANDERSON FOWLER, of the city, county, and State of New York, have invented an Improvement in Methods of Preserving and Curing Fats, Meats, &c., of which the following is a specification.

This invention consists in subjecting meats, whether in pieces or carcasses, also fats, fish, &c., to the action of electricity in such manner as to effect what I term a "partial disintegration" or "structural change" in the condition of the meat, fat, or fish, as the case may be, whereby, as I have determined by experiment and trial, the meat or like organic substance is rendered capable of more readily absorbing and uniting with liquid, semi-liquid, or solid preservative substances—such as salt, saltpeter, salicylic acid, or other materials employed or capable of being used for the curing and preservation of organic substances of the character mentioned—the preservative agent being applied around and in contact with the substance to be preserved or cured, either in a dry form or in the form of a solution or semi-solution, as above indicated.

In the practice of my invention I take the meat, the fat, or the fish, as the case may be, and place the same in the curing or preservative substance, the latter being either dissolved in water or other suitable menstruum, and thus brought to a liquid or semi-liquid condition, or placed in its granular or other solid form or condition around or in contact with the meat or other organic substance to be preserved, and the whole being placed in any suitable receptacle—such, for example, as the ordinary barrels, casks, &c., used for holding cured or pickled meats. I then arrange a suitable source of electricity in such manner that one or more currents will be caused to traverse through the meat or like organic substance and through the preservative substance around the same. The receptacle, however, must be so constructed that the current of electricity will pass through the meat or like organic substance, and preferably also through the preservative substance, and not around the sides of the receptacle. One of the poles of the circuit may be arranged at the bottom of the receptacle containing the meat or other like organic substance to be preserved, and the other of the poles may be provided at the top of said receptacle; or the two poles may be placed at opposite sides of the said receptacle, the arrangement being such that the current of electricity will be caused to traverse through the preservative substance around or in contact with the meat and also through the meat or other like organic substance itself, the result being that a structural disturbance is caused within the mass of the meat or like organic substance, which materially changes its character, so far as its power of absorbing and combining with the salt, saltpeter, or other curing and preservative agent is concerned. From this there result two positive advantages: First, the rapidity with which the preservative agent combines with the meat or other like organic substance enables the curing process to be effected in a mere fraction of the time required by the old or usual methods; second, the preservative substance or agent, uniting more actively and intimately with the meat or like organic substance itself, causes a more perfect "chemical combination," as it may be termed, between said preservative agent and the meat or like organic substance itself, and thereby, as shown by actual trial, insures a more perfect curing and more thorough preservation of the meat or like organic substance than is effected by the old or usual methods.

What I claim as my invention is—

The within-described process of expediting or hastening the preservation of meats, fats, fish, and like organic substances subjected to the process of curing, which consists in making the foods, while in the presence of preservative agents, a portion of an electrolytic circuit, substantially as set forth.

ANDERSON FOWLER.

Witnesses:
H. T. ANDERSON,
ROBERT STOBER.